Jan. 22, 1963 A. G. T. BOERYD 3,075,048

SIGNALLING ARRANGEMENT FOR TELEPHONE INSTRUMENTS

Filed Oct. 28, 1959

INVENTOR
ARNE GÖSTA TORILD BOERYD

BY Hane and Nydick
ATTORNEYS

United States Patent Office 3,075,048
Patented Jan. 22, 1963

3,075,048
SIGNALLING ARRANGEMENT FOR TELEPHONE INSTRUMENTS

Arne Gösta Torild Boeryd, Stockholm, Sweden, assignor to Telefonaktiebolaget L M Ericsson, Stockholm, Sweden, a corporation of Sweden Filed Oct. 28, 1959, Ser. No. 849,204
Claims priority, application Sweden Nov. 5, 1958
6 Claims. (Cl. 179—84)

It has been proposed to use for telephone instruments of the standing micro-telephone type, the normal receiver of the instrument as a signalling device. Such receiver is supplied during signalling with a suitable voice frequency alternating current and thus produces a signalling tone which is pleasant to the ear. The arrangement can for example be such that the receiver is actuated by a voice frequency current supplied from the exchange.

The idea to use the normal receiver of the instrument as a signalling device, however, entails certain disadvantages:

(1) There exists a possibility of unfavorably influencing the transmission data of the regular receiver.

(2) By misuse of the instrument there is a certain possibility of receiving a ring in the ear from the receiver.

(3) Some telephone instruments are provided with amplitude limiting devices connected in parallel with the receiver, for preventing acoustic jars from the receiver. As these devices cause practically short-circuiting of the receiver for voltages over about three volts, additional switchhook contacts must be provided for disconnecting the amplitude limiting device, when the instrument is in ringing condition.

The purpose of the present invention is to produce a signalling arrangement for telephone instruments of the standing micro-telephone type (with a receiver placed in the upper part of the handle) in which said disadvantages are eliminated. The casing for such instruments is now manufactured as a shell of thermo plastic material, and the inside of the handle of the instrument is up to now practically unused. According to the invention a second receiver or a similar sound producer and an acoustic load (funnel or resonator) connected thereto, are provided in the handle or in the upper portion of the foot part, the input impedance of said load at the connection point to the sound producer being suitably matched to the acoustic impedance of the sound producer. As a result, said second sound producer, being especially arranged for the signalling, can be dimensioned (as regards diaphragm, acoustic load and so on) solely with regard to its qualities as an effective signalling producer thus obtaining an increased signalling power. It has shown that, with an arrangement according to the invention, an increase of the signalling is obtained corresponding to 15 db compared with the intensity of sound obtained when the normal receiver is used as signalling producer. Since the sound producer and the funnel or resonator are arranged in the handle, which latter has not been utilized before, they will not increase the total cubic measurement of the instrument.

Figure 1:
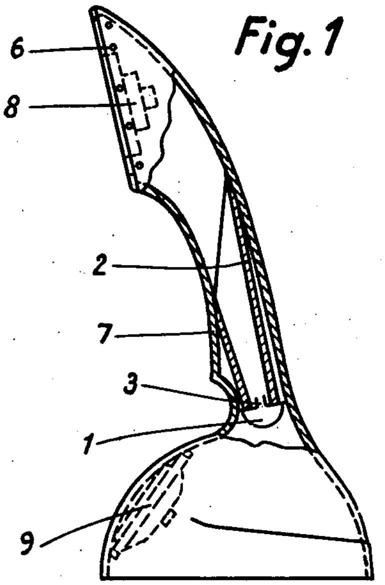
Figure 2:
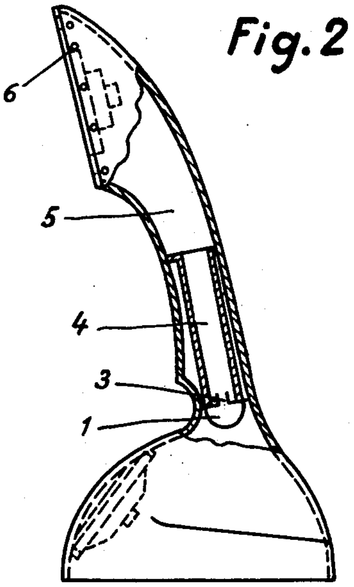
Figure 3:
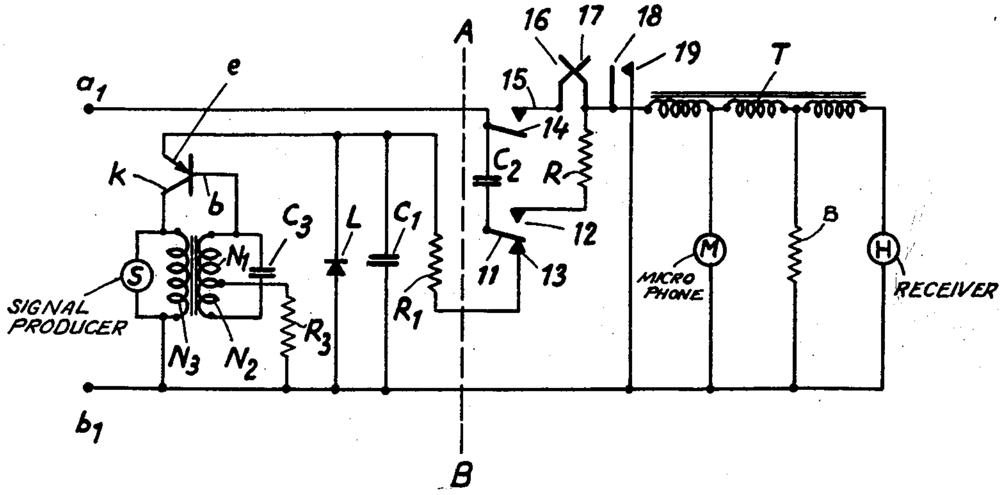

The invention will be further described with reference to the accompanying drawings, which show two embodiments. FIGS. 1 and 2 show a standing micro-telephone seen from the side partly in longitudinal section. FIG. 3 is a circuit diagram. In FIGS. 1 and 2 the casing 7 is partly taken away. In FIG. 1 reference 8 indicates a receiver placed in the upper part of the handle and 9 a microphone. In the lower part of the handle a sound producer 1 (for example a small loud-speaker) is arranged having an aperture 3, which is connected to a suitable acoustic load in the form of a horn 2, whose acoustic input impedance at the connection point to the sound producer is matched to the acoustic impedance of said sound producer 1. Such matching increases the efficiency of the sound producer. The periphery of the receiver cap is found with holes 6 of a suitable dimension for passing sound waves from the sound producer 1.

When signalling the sound producer 1 is actuated by means of voice frequency current of a suitable frequency, for example 2000 periods per second, sent from the exchange. Said sound producer can be connected to the telephone instrument in the same way as a bell (that is the sound producer is connected in series with a condenser over the line branches). The voice frequency current can also be generated by an oscillator arranged in the instrument and activated by signals coming from the exchange. In the case modulated signal current is used for the signalling the embodiment according to FIG. 2 can be advantageously used. In this case the telephone instrument may be provided with a transistor oscillator, whose generated oscillations are modulated by the ringing current sent from the exchange so that a modulated current is obtained from the oscillator, said current being supplied to the signal producer 1. The principle of such an arrangement is shown in FIG. 3.

To the right of the vertical line A—B of short dashes in FIG. 3 the speech circuit is shown, which is a conventional antiside-tone-connection with a transformer T with three windings and a microphone M, a receiver H and a balance resistance B. 16 and 17 indicate the impulse contact, 18 and 19 a contact for short-circuiting the speech equipment during the impulsing, 11—15 indicate the contacts controlled by the switch-hook and R a resistance, which in series with the condenser C2 forms a spark quenching circuit for the impulse contact 16, 17. The speech circuit is connected in circuit when the micro-telephone is lifted, whereby the contacts 14, 15 and 11, 12 are closed. To the left on the line A—B, the signal circuit is shown which is connected in circuit when the micro-telephone is replaced, whereby the contacts 14, 15 and contacts 11, 12 are broken and 11, 13 closed. $a_1$ and $b_1$ indicate line terminals. The signalling arrangement comprises a direct current generating circuit with a rectifier L and a condenser $C_1$. The condenser is charged by the incoming ringing current during the positive half-periods of the ringing current, when the line conductor $a_1$ is positive in relation to the line conductor $b_1$. During these positive half-periods current flows from the line conductor $a_1$ through the condenser $C_2$ and through the resistance $R_1$, through the condenser $C_1$ to the line conductor $b_1$. During the negative half-periods of the ringing current, when the line conductor $b_1$ is positive in relation to the line conductor $a_1$, the condenser $C_1$ is short-circuited by the half-wave rectifier L which has a negligible resistance for current flowing from $b_1$ to $a_1$ and practically forms an infinite resistance for current in the opposite direction. Thus the condenser $C_1$ constitutes a source of potential from which a pulsing direct current can be derived. The upper plate of the condenser constitutes the positive pole and the lower plate the negative pole in the shown embodiment.

The transistor ($b$, $e$, $k$) of the oscillator, which is here supposed to be of PNP-type, has the emitter $e$ connected to the positive pole of the potential source (condenser $C_1$), the base electrode $b$ connected to the negative pole of the potential source through the winding $N_1$ and the resistance $R_3$, the winding $N_1$ being parallelly connected to the condenser $C_3$ and the winding $N_2$. The collector $k$ is connected to the negative pole of the condenser $C_1$ by means of a parallel circuit, one branch of which is the winding $N_3$ and the second branch is the signal producer S (corresponds to 1 in FIGS. 1 and 2). The two windings $N_1$ and $N_2$ together with the condenser $C_3$ and the resistance $R_3$ form the feed-back circuit of the oscillator.

When a ringing signal, which normally is 25 periods per second, reaches the telephone instrument through the terminals $a_1$, $b_1$ the condenser $C_1$ is charged during the first positive period whereby the emitter $e$ of the transistor becomes positive in relation to the base electrode $b$. Current will thus flow in the emitter-base circuit, and since the collector $k$ is also negative in relation to the emitter $e$, a current appears in the output circuit of the transistor from the collector $k$ via the signal producer S and the winding $N_3$ to the negative pole. The current through the winding $N_3$ induces a potential in the windings $N_1$ and $N_2$ with such a direction that the potential of the base electrode $b$ is further decreased, whereby the output current is increased and in turn induces a greater potential in the feed-back windings $N_1$ and $N_2$. The oscillator gives herewith voice-frequency oscillations which are modulated by the ringing signals, and these modulated oscillations are supplied to the signal producer S. The frequency of the pulses generated by the oscillator is determined by the inductances of the windings and by the condenser $C_3$.

The modulated current, which is supplied to the signal producer S, consists of a carrier wave oscillation and two side wave oscillations. In the embodiment according to FIG. 2, the handle and the upper portion of the instrument are divided according to the invention into two series-connected resonators 4, 5 of which one, 4, is dimensioned so that its resonance frequency coincides with the frequency of one of said two side waves and the second resonator 5 is dimensioned so that its resonance frequency coincides with the frequency of the second side wave.

The acoustic input impedance for the resonator 4, connected to the sound producer S, is matched to the acoustic impedance of said producer.

An increase of the efficiency is thus obtained partly by the matching and partly by amplification of the side frequencies of the signal.

In the embodiments shown in FIGS. 1 and 2 the mechanical resonance frequency of the sound producer is suitably chosen so that it coincides with the frequency of the voice frequency current supplied to the sound producer.

In FIGS. 1 and 2 the acoustical load is shown as a separate resonator (2 respectively 4) inserted in the handle. It is not necessary to have a separate resonator. The walls of the handle may form a resonator of any shape wanted.

In FIGS. 1 and 2 the microphone 9 is only diagrammatically shown in the foot part of the instrument. The foot part accommodates, of course, also all the other necessary electric components, for example as shown in the publication Ericsson Review, 1956, No. 4, and possibly also said oscillator and other components necessary for signalling.

I claim:

1. In a standing micro-telephone instrument of the kind having a foot and a hollow handle rising from said foot, a telephone receiver constituting a sound producer disposed in the upper part of the handle and a telephone microphone in the foot of the instrument, a signalling arrangement comprising an additional sound producer emitting a signalling tone in response to receiving audio-frequency currents and disposed in the lower half of the instrument, and an acoustic loading member disposed within said handle above said additional sound producer in acoustically coacting relationship therewith.

2. In a standing micro-telephone instrument of the kind having a foot and a hollow handle rising from said foot, a telephone receiver constituting a sound producer disposed in the upper part of the handle and a microphone in the foot of the instrument, a signaling arrangement comprising an additional sound producer emitting a signaling tone in response to receiving audio-frequency currents and disposed in the lower half of the instrument, and an acoustic loading member disposed within said handle, said additional sound producer being disposed closely adjacent the lower end of said loading member, the input impedance of the loading member at said end being matched to the acoustic impedance of said additional sound producer.

3. A micro-telephone instrument according to claim 2 wherein said acoustic loading member is in the form of a funnel extending lengthwise in said handle, the narrow end of said funnel facing said additional sound producer.

4. In a standing micro-telephone instrument of the kind having a foot and a hollow handle rising from said foot, a telephone receiver constituting a sound producer disposed in the upper part of the handle and a microphone in the foot of the instrument, a signaling arrangement comprising an additional sound producer emitting a signaling tone in response to receiving audio-frequency currents and disposed in the lower half of the instrument, said audio-frequency currents being generated and modulated in the instrument by the ringing current transmitted to the instrument from a telephone exchange, and an acoustic loading member disposed within said handle above said additional sound producer in acoustically coacting relationship therewith, said acoustic loading member including two resonators connected in series, one of said resonators having a resonance frequency coinciding with one of the two side frequencies of said modulated oscillations and the other having a resonance frequency coinciding with the other side frequency.

5. A micro-telephone instrument according to claim 1 wherein said handle at the top thereof includes apertures leading into the hollow handle for passing sound waves emanating from said additional sound producer.

6. A micro-telephone instrument according to claim 1 wherein said additional sound producer has a mechanical resonance frequency substantially coinciding with the frequency of the audio-frequency currents exciting said additional sound producer.

References Cited in the file of this patent

UNITED STATES PATENTS

| | | |
|---|---|---|
| 2,392,321 | Hersey | Jan. 8, 1946 |
| 2,405,543 | Blomberg | Aug. 6, 1946 |
| 2,910,538 | Aleksa | Oct. 27, 1959 |
| 2,951,910 | Bauman | Sept. 6, 1960 |